United States Patent
Sawada et al.

(10) Patent No.: US 7,714,294 B2
(45) Date of Patent: May 11, 2010

(54) RADIATION DETECTING APPARATUS AND RADIOGRAPHING SYSTEM

(75) Inventors: Satoru Sawada, Kodama-gun (JP); Satoshi Okada, Zama (JP); Masato Inoue, Kumagaya (JP); Kazumi Nagano, Fujisawa (JP); Shinichi Takeda, Honjo (JP); Keiichi Nomura, Honjo (JP); Yoshihiro Ogawa, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 12/132,782

(22) Filed: Jun. 4, 2008

(65) Prior Publication Data

US 2008/0308739 A1 Dec. 18, 2008

(30) Foreign Application Priority Data

Jun. 12, 2007 (JP) ............................. 2007-155153

(51) Int. Cl.
*G01T 1/20* (2006.01)
(52) U.S. Cl. ................................. 250/370.11
(58) Field of Classification Search ............ 250/370.08, 250/370.09, 370.11; 313/502, 503, 504
See application file for complete search history.

(56) References Cited

U.S. PATENT DOCUMENTS

| | | | | |
|---|---|---|---|---|
| 5,229,628 | A * | 7/1993 | Kobayashi et al. ........... | 257/103 |
| 5,643,496 | A * | 7/1997 | Brese et al. ............ | 252/301.6 S |
| 5,973,327 | A * | 10/1999 | Moy et al. .............. | 250/370.09 |
| 6,020,590 | A * | 2/2000 | Aggas et al. ............ | 250/370.09 |
| 6,262,422 | B1 | 7/2001 | Homme et al. .......... | 250/370.11 |
| 7,227,151 | B2 * | 6/2007 | Endo ...................... | 250/370.09 |
| 7,256,404 | B2 | 8/2007 | Inoue et al. ............ | 250/370.11 |
| 7,315,027 | B2 | 1/2008 | Okada et al. ............ | 250/370.11 |
| 7,361,413 | B2 * | 4/2008 | Kinlen ........................ | 428/690 |
| 7,391,029 | B2 | 6/2008 | Takeda et al. ........... | 250/370.11 |
| 7,400,085 | B2 * | 7/2008 | Hasegawa .................... | 313/503 |
| 2002/0014592 | A1 * | 2/2002 | Rutten et al. ................. | 250/368 |
| 2005/0161754 | A1 * | 7/2005 | Izumi .......................... | 257/432 |
| 2005/0230629 | A1 * | 10/2005 | Watanabe et al. ...... | 250/370.01 |
| 2006/0033040 | A1 | 2/2006 | Okada et al. ............ | 250/484.2 |
| 2007/0057170 | A1 * | 3/2007 | Hornig .................... | 250/252.1 |
| 2007/0131867 | A1 | 6/2007 | Okada et al. ............ | 250/370.09 |
| 2007/0159063 | A1 * | 7/2007 | Kubota et al. ............... | 313/502 |
| 2007/0205371 | A1 | 9/2007 | Inoue ..................... | 250/370.11 |
| 2007/0222915 | A1 * | 9/2007 | Niioka et al. ................. | 349/62 |
| 2007/0257198 | A1 | 11/2007 | Ogawa et al. ........... | 250/370.11 |
| 2008/0083877 | A1 | 4/2008 | Nomura et al. ......... | 250/370.11 |

* cited by examiner

*Primary Examiner*—David P Porta
*Assistant Examiner*—Djura Malevic
(74) *Attorney, Agent, or Firm*—Fitzpatrick, Cella, Harper & Scinto

(57) ABSTRACT

A radiation detecting apparatus includes: a sensor panel having a substrate and a photoelectric conversion element array arranged on the substrate; a scintillator layer arranged on one surface side of the sensor panel; and a light generator arranged on the sensor panel at the other side in opposition to the one side on which the scintillator layer is arranged, in corresponding to an area in which the photoelectric conversion element array is arranged. The light generator includes a light transmitting electrode layer, a rear electrode layer and a light emitting layer arranged between the light transmitting electrode layer and the rear electrode. The light emitting layer according to a first aspect is formed from light emitting substance, a binder and a black pigment. The light emitting layer according to a second aspect contains a first pigment or dye absorbing a light of the same wavelength of a maximum light emission from the scintillator layer, and a second pigment or dye different from the first pigment or dye.

9 Claims, 3 Drawing Sheets

RADIATION DETECTING APPARATUS AND RADIOGRAPHING SYSTEM

BACKGROUND OF THE INVENTION

1. Field of the Invention

The present invention relates to a radiation detecting apparatus and a radiographing system used for medical diagnosis equipment, non-destructive inspection equipment and the like. Particularly, the present invention relates to a radiation detecting apparatus and a radiographing system used for X-ray radiographing and the like.

2. Description of the Related Art

Conventionally, X-ray radiographing uses an X-ray film system including a phosphor screen including an X-ray excitement phosphor layer within the screen and double-side coating. Instead of the system, research and development of a digital radiation detecting apparatus is active recently. It is because a digital radiation detecting apparatus including an X-ray scintillator layer and a two-dimensional light detector provides better image properties than the radiation detecting apparatus including the X-ray film system. Additionally, the digital apparatus has an advantage that data can be shared by importing the data to a networked computer system since the data is digital data.

Among such digital radiation detecting apparatuses, U.S. Pat. No. 6,262,422 discloses a highly sensitive and high-definition apparatus: an apparatus including a scintillator layer to convert radiation into light that can be detected by a photo sensor, in which a plurality of photo sensors and electric elements such as TFT form the scintillator layer on a light detector including photoelectric conversion element units being arranged in a plane.

Particularly, U.S. Pat. No. 5,973,327 discloses an apparatus for coloring a wavelength selectivity transmitting part and using the part as a wavelength selective filter, the apparatus comprising a light source for optical reset operation or optical calibration operation.

However, a light wavelength selecting method using a coloring absorption layer as in the above conventional examples need to include a plurality of layers, making the apparatus configuration complex and thick. Further, the configuration of a plurality of layers increases reflected light from an interface. That is, reflected light returned from a light emitter to a sensor panel lowers the quality of a shot image as abnormality in the image. As such, it is required to reduce the reflected light as much as possible. Therefore, a radiation detecting apparatus is needed that has simpler configuration and more efficiently reduces reflected light from a light emitter to a sensor panel than the conventional ones.

SUMMARY OF THE INVENTION

In view of the above problems, it is an object of the present invention to provide a highly reliable radiation detecting apparatus for optical calibration in which a light emitting layer of a light emitter efficiently reduces light transmitting a photoelectric conversion element to improve the image quality.

One aspect of a radiation detecting apparatus according to the present invention includes: a sensor panel having a substrate and a photoelectric conversion element array arranged on the substrate; a scintillator layer arranged on one surface side of the sensor panel; and a light generator arranged on the sensor panel at the other side in opposition to the one side on which the scintillator layer is arranged, in opposition to an area in which the photoelectric conversion element array is arranged, wherein: the light generator includes a light transmitting electrode layer, a rear electrode layer and a light emitting layer arranged between the light transmitting electrode layer and the rear electrode layer, the light emitting layer is formed from light emitting substance, a binder and a black pigment. The photoelectric conversion element array includes a plurality of pixels. The light emitting layer contains the black pigment to have a distribution profile such that an average concentration of the black pigment in an area facing an area between adjacent pixels is larger than an average concentration of the black pigment in an area facing the pixels.

A second aspect of the present invention is a radiation detecting apparatus being characterized by including: a sensor panel having a photoelectric conversion element array arranged on a substrate; a scintillator layer arranged on one surface side of the sensor panel; and a light generator arranged on the sensor panel at the other side in opposition to the one side on which the scintillator layer is arranged, in opposition to an area in which the photoelectric conversion element array is arranged, wherein: the light generator includes at least a light transmitting electrode layer, a light emitting layer and a rear electrode layer, the light emitting layer is formed from light emitting substance, a binder and a pigment or a dye, and the pigment or the dye contains a first pigment or dye absorbing a light of the same wavelength of a maximum light emission from the scintillator layer, and a second pigment or dye different from the first pigment or dye. The scintillator layer contains CsI:Tl, the first pigment or dye is colored purple, and the second pigment or dye is colored at least one selected from the group consisting of yellow, orange, red, red-purple, blue, blue-green and green-blue. The pigment or dye absorbs light of wavelength 400 to 750 nm. The photoelectric conversion element array includes a plurality of pixels, and the light emitting layer contains the pigment or dye to have a distribution profile such that an average concentration of the pigment or dye in an area facing an area between adjacent pixels is larger than an average concentration of the pigment or dye in an area facing the pixels.

The present invention is further characterized in that the light generator is an electroluminescence type.

Further, the present invention is a radiographing system being characterized by including at least the radiation detecting apparatus according to any of the above and a signal processing unit for processing a signal from the radiation detecting apparatus.

The present invention can provide a radiation detecting apparatus that realizes simpler configuration and higher durability than conventional ones.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

The following will describe the exemplary embodiments to carry out the present invention in detail with reference to the drawings. The description herein is based on a category of radiations including electromagnetic waves such as X-rays and y-rays, and particle rays such as α-rays and β-rays.

Figure 1:
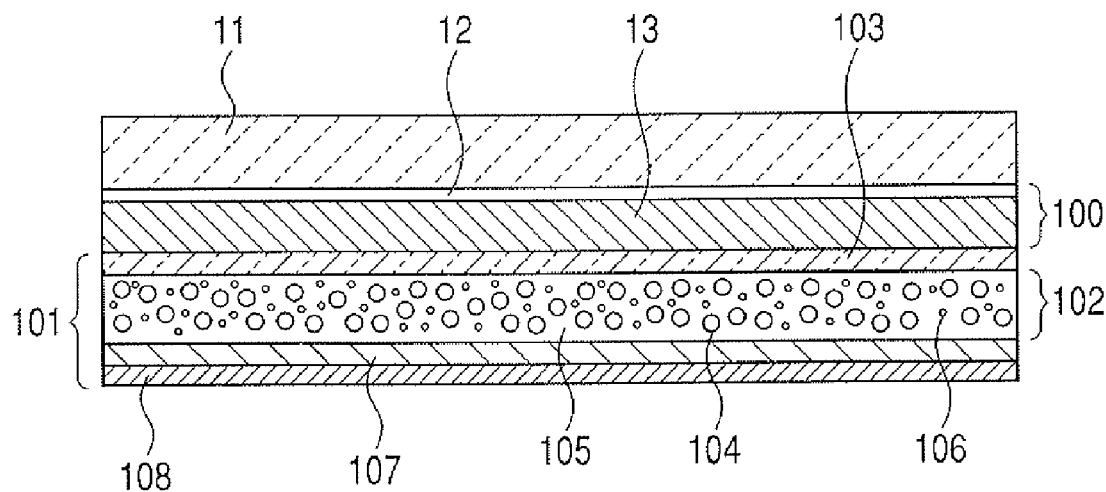
FIG. 1 is a cross-sectional view illustrating an embodiment of a radiation detecting apparatus according to the present invention.

FIG. 1 is a cross-sectional view illustrating a radiation detecting apparatus according to the present invention. The radiation detecting apparatus according to the present invention has a structure in which a scintillator layer 11, a sensor panel 100 and a light emitting unit 101 are layered from the top in that order. That is, the apparatus includes the sensor panel 100, the scintillator layer 11 arranged at one surface side of the sensor panel 100, and the light emitting unit 101 arranged at the other side of the scintillator layer side of the sensor panel 100. The sensor panel and the scintillator layer are generally arranged adjacently to each other.

The sensor panel 100 is formed by a photoelectric conversion element array 12 and a substrate 13. The photoelectric conversion element array 12 is arranged on the substrate 13. The scintillator layer 11 contains a material to convert radiation into light that can be sensed by the photoelectric conversion element array. To dispose the scintillator layer 11 over the sensor panel 100, the layer 11 may be formed directly on the sensor panel 100. Alternatively, the scintillator layer may be formed on a supporting substrate, and the layer and the substrate can be bonded together.

A material of the scintillator layer 11 includes a particle excitement phosphor such as $Gd_2O_2S:Tb$ or an alkali halide scintillator. Particularly, a scintillator can have an alkali halide columnar crystal structure such as CsI:Na and CsI:Tl that is formed by evaporation on a sensor panel.

The light emitting unit 101 includes at least a light transmitting electrode layer 103, a light emitting layer 102 and a rear electrode layer 108. A dielectric constant body layer 107 can be arranged at least one of between the light transmitting electrode layer 103 and the light emitting layer 102 and between the light emitting layer 102 and the rear electrode layer 108 to improve voltage endurance. The light emitting layer 102 is formed from light emitting substance 104, a binder 105 and a black pigment 106.

A material of the light transmitting electrode layer 103 includes a light transmitting conductor such as indium tin oxide (ITO), $SnO_2$ or ZnO. Among them, the material can include indium tin oxide (ITO).

A material of the light emitting layer 102 is specifically a fine particle of a semiconductor of one or more elements selected from a group of group II elements and group VI elements, and one or more elements selected from a group of group III elements and group V elements. The material is arbitrarily selected depending on a required light emitting wavelength area. For example, the material includes CdS, CdSe, CdTe, ZnS, ZnSe, ZnTe, CaS, MgS, SrS, GaP, GaAs and a mixed crystal of them, among which ZnS, CdS and CaS can be selected. An activator can be a metal ion such as Mn or Cu and a rare earth element. A co-activator that is added as necessary can be a halogen element such as Cl, Br or I, or Al.

A material of the binder 105 can be high dielectric constant substance such as cyanoethyl cellulose.

A material of the dielectric constant body layer 107 includes any material that has high permittivity, insulation properties and dielectric breakdown power voltage. Specifically, the material can be metallic oxide and nitride such as $TiO_2$, $BaTiO_3$, $SrTiO_3$, $PbTiO_3$, $KNbO_3$, $PbNbO_3$, $Ta_2O_3$, $BaTa_2O_6$, $LiTaO_3$, $Al_2O_3$, $ZrO_2$ and AlON.

A material of the rear electrode layer 108 includes metal, alloy, an electrically conducting compound and an amalgam of them. Specifically, the material includes: sodium, potassium, sodium-potassium alloy, magnesium, lithium, magnesium/copper amalgam, magnesium/silver amalgam, magnesium/aluminum amalgam, magnesium/indium amalgam, aluminum/aluminum oxide amalgam, indium, lithium/aluminum amalgam, rare-earth metal and the like. Among them, the material can be magnesium/silver amalgam, magnesium/aluminum amalgam, magnesium/indium amalgam in view of oxidative resistance.

The light emitting layer contains the black pigment 106, which is a feature of the present invention. The black pigment 106 is dispersed in the light emitting layer. The black pigment 106 has an absorption wavelength area that is at least wider than a light emitting wavelength area of the scintillator layer. For example, if the scintillator layer contains CsI (Tl), the layer has a broad peak having the maximum light emitting wavelength within a range from 500 to 600 nm. Then, the light emitting wavelength area is from 400 to 750 nm at maximum. A black pigment can absorb light in a wide wavelength range so that the pigment can absorb light of a wavelength emitted by CsI (Tl) to reduce reflected light to the photoelectric conversion element array, thereby improving the image quality. A black pigment can be carbon black containing carbon, titanium black obtained through titanium oxidation or reduction of titanium dioxide, or a black metallic oxide pigment. Particularly, carbon black can be channel black or furnace black being a very fine particle. A black metallic oxide pigment can be an oxide of copper, iron, chromium, manganese or cobalt, or a combined metallic oxide of at least two kinds selected from the group consisting of above metallic oxides.

Instead of a black pigment, other color pigments can be used. For example, if the peak wavelength of light emission by CsI (Tl) is 570 nm, the binder can contain a purple pigment absorbing a wavelength of 570 nm. To sufficiently absorb light emitted by CsI (Tl), the binder contains purple and at least one kind of pigment, which will be described later. In an area of a shorter wavelength than the peak wavelength, green-yellow (400 to 435 nm), yellow (435 to 480 nm), orange (480 to 490 nm), red (490 to 500 nm), and red-purple (500 nm to 560 nm) pigments can be used. In an area of a longer wavelength than the peak wavelength, blue (580 to 595 nm), green-blue (595 to 610 nm), and blue-green (610 to 750 nm) pigments can be used. The numerical values in the brackets represent absorption wavelengths of the respective colors. If the light emitting layer contains at least one of yellow, orange, red, red-purple, blue, green-blue and blue-green pigments and a purple pigment, a wider light emitting wavelength area of the scintillator layer can be absorbed and hence reflected light can be reduced, so that the image quality improves. That is, it is required, for reduction of reflected light, to mix a color pigment or dye (first pigment or dye) absorbing the maximum light emitting wavelength of the scintillator layer and at least one kind of color pigment or dye (second pigment or dye) other than the first pigment or dye.

Since light radiated from the surface of the light emitting unit 101 on the side of the sensor panel 100 is radiated to improve variation in properties of the photoelectric conversion element, the photoelectric conversion element requires proper amount of radiation intensity. For this purpose, it is required for the black pigment 106 and a mixed material of pigments of at least two colors other than black to transmit radiation light from the light emitting unit 101. As such, a wavelength area absorbed by the black pigment 106 and the mixed material of pigments of at least two colors other than black can be an area equivalent to the light emitting wavelength of the scintillator layer, and the amount of absorption by the wavelength area of the light emitting unit can be small. Or, the light emitting wavelength area of the light emitting unit can be wider than wavelength absorption areas of the pigments. Further, the reflection rate of the wavelength area absorbed by the photoelectric conversion element can be low. Furthermore, even if the light emitting wavelength area of the light emitting unit is within the absorption wavelength area of the pigments, the amount of light emission by the light emitting unit is increased so that the light emitting unit can radiate proper amount of light to the photoelectric conversion element.

According to the above, the black pigment 106 is dispersed in the light emitting layer 102 to efficiently reduce reflected light to the sensor panel. However, the binder can contain a dye so that the binder itself is colored by the dye to reduce the reflected light. A color of the dye is similar to a pigment. The light emitting unit 101 can be arranged in opposition to an area where the photoelectric conversion element array is arranged and over a wider area for the optical calibration effect and reduction of reflected light.

Figure 5:
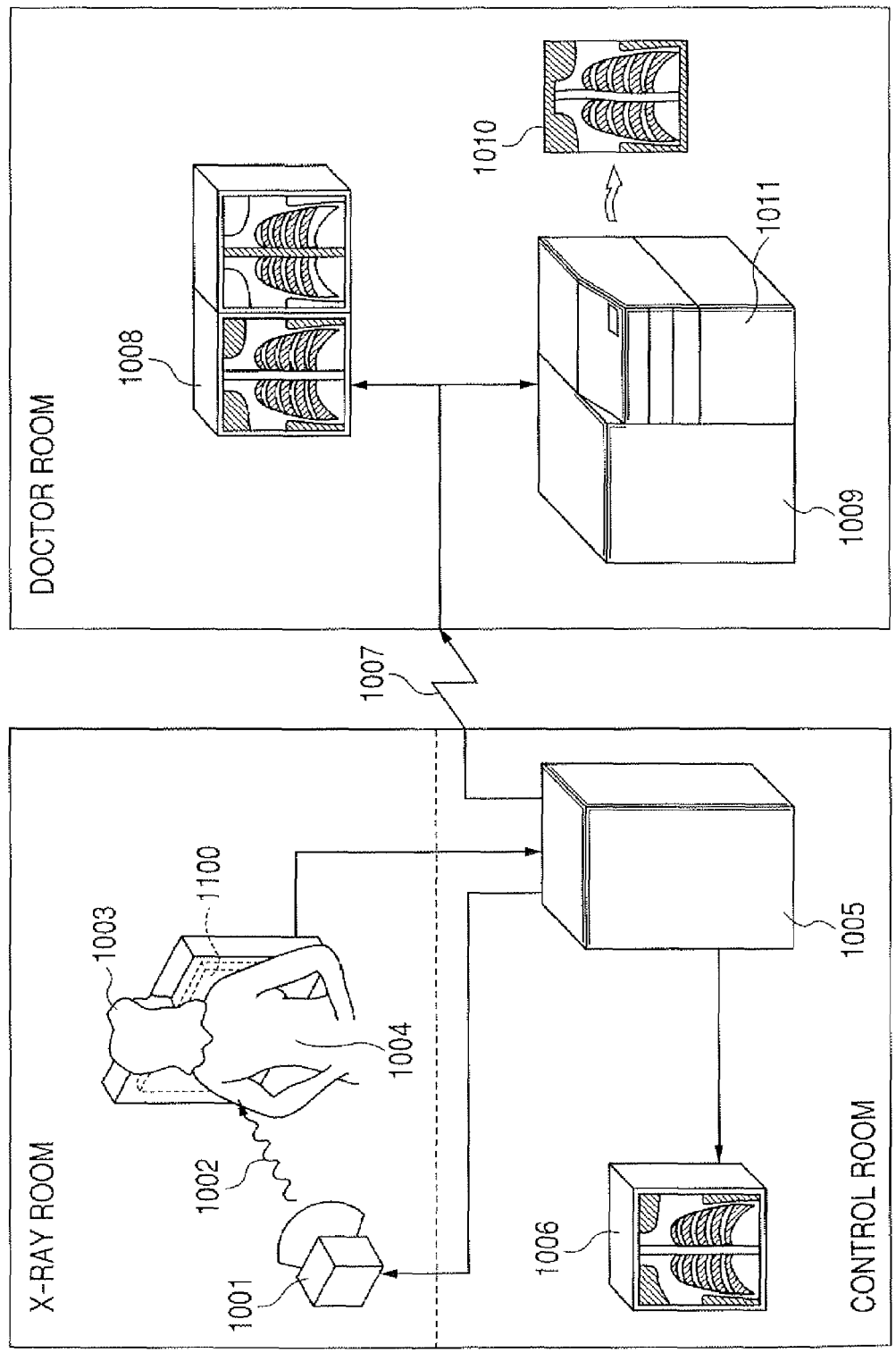
FIG. 5 is a schematic diagram of a radiographing system including the radiation detecting apparatus according to the present invention.

FIG. 5 is a diagram illustrating an application of the radiation detecting apparatus according to the present invention to a radiographing system.

Radiation 1002 generated in a radiation tube 1001 transmits a body part 1004 such as a chest of an examinee (patient, for example) 1003, and enters a radiographing apparatus 1100 which implements a scintillator in the upper part. The incoming radiation 1002 includes information in the body of the examinee 1003. In the radiographing apparatus 1100, the scintillator emits light in correspondence to the incoming radiation 1002, converts the light into electricity to gain electric information. The radiographing apparatus 1100 can also directly convert the radiation 1002 into electric charge to gain the electric information. The information is converted into digital information, subjected to image processing by an image processor 1005 as a signal processing unit, and displayed on a display 1006 as a display unit in a control room.

The information can be also transferred to a remote site by a wireless or wired transmission unit 1007 such as a telephone line. This enables the information to be displayed on a display 1008 as a display unit installed in a doctor room on another place, or saved in a recording medium such as an optical disc by a film processor 1009 as a storage unit. This also enables diagnosis by a doctor at a remote site. The film processor 1009 can be connected to a laser printer as a print unit to record information transmitted by the transmission unit 1007 on a recording medium such as a film.

The following will describe embodiments of the present invention in detail. However, the present invention is not limited to the following examples.

First Embodiment

FIG. 1 is a cross-sectional view of the radiation detecting apparatus according to this embodiment. As shown in FIG. 1, the light emitting unit 101, the sensor panel 100, and the scintillator layer 11 being CsI (Tl) on the sensor panel are arranged in the apparatus. The black pigment 106 is dispersed in the light emitting layer 102 of the light emitting unit 101. The black pigment 106 is carbon black; specifically, channel black is used herein. The light emitting unit 101 can radiate light to at least a light reception range of the photoelectric conversion element array 12. The black pigment 106 efficiently absorbs light transmitting the substrate 13 from the sensor panel by light emission from the scintillator layer, so that a trace amount of components are reflected on the photoelectric conversion element array 12 of the sensor panel 100. The black pigment 106 also absorbs light from the light emitting unit 101. As such, the amount of light emission from the light emitting unit 101 is larger than the light transmitting the substrate 13 from the sensor panel by light emission from the scintillator layer. In the above manner, a black pigment is dispersed so that light necessary for optical calibration can transmit the apparatus, thereby reducing reflected light inducing degradation of the image quality to an unproblematic level in view of the quality.

Figure 2:
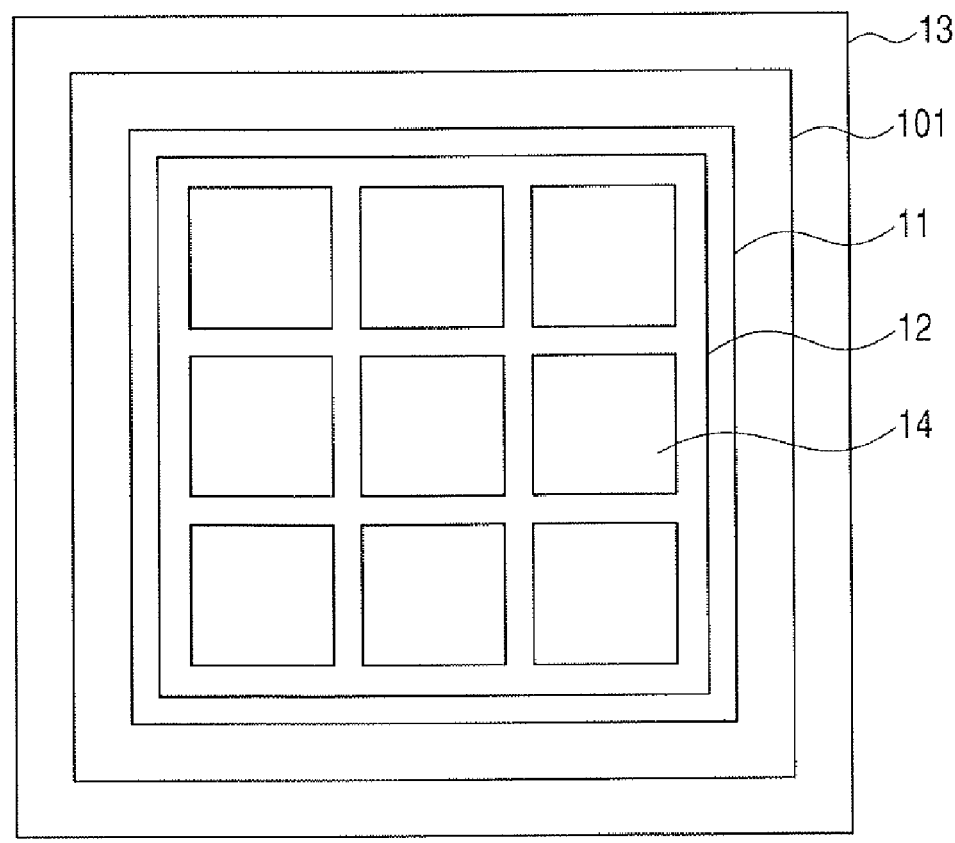
FIG. 2 is a front view of a variation of the embodiment shown in FIG. 1.

FIG. 2 is a plain view of a variation of the radiation detecting apparatus according to this embodiment from the radiation incoming side.

As shown in FIG. 2, this example includes the substrate 13, the photoelectric conversion element array 12 arranged on the substrate 13, the scintillator layer 11, and the light emitting unit 101 arranged over a wider area than the photoelectric conversion element array and the scintillator layer 11. The light emitting unit 101 can be arranged in opposition to the area where the photoelectric conversion element array 12 is arranged, and in a wider area for an optical calibration effect and reduction of reflected light. The photoelectric conversion element array 12 includes 3×3 pixels 14 to simplify the diagram. The number of pixels is not limited to 3×3, but many more, for example, 2000×2000 pixels can be used. The light emitting unit 101 contains the black pigment to have a distribution profile such that an average concentration of the black pigment in an area facing an area between adjacent pixels is larger than an average concentration of the black pigment in an area facing the pixels. Such configuration can keep the amount of light emission by the light emitting unit 101 at a sufficient degree, and reduce reflection of light from the scintillator layer 11 that passes through areas between the pixels.

Herein, the light emitting unit 101 can be an electroluminescent light source such as electroluminescence (EL). The light emitting unit 101 can divide at least one electrode to emit light for partial optical calibration, thereby reducing power consumption.

Second Embodiment

Figure 3:
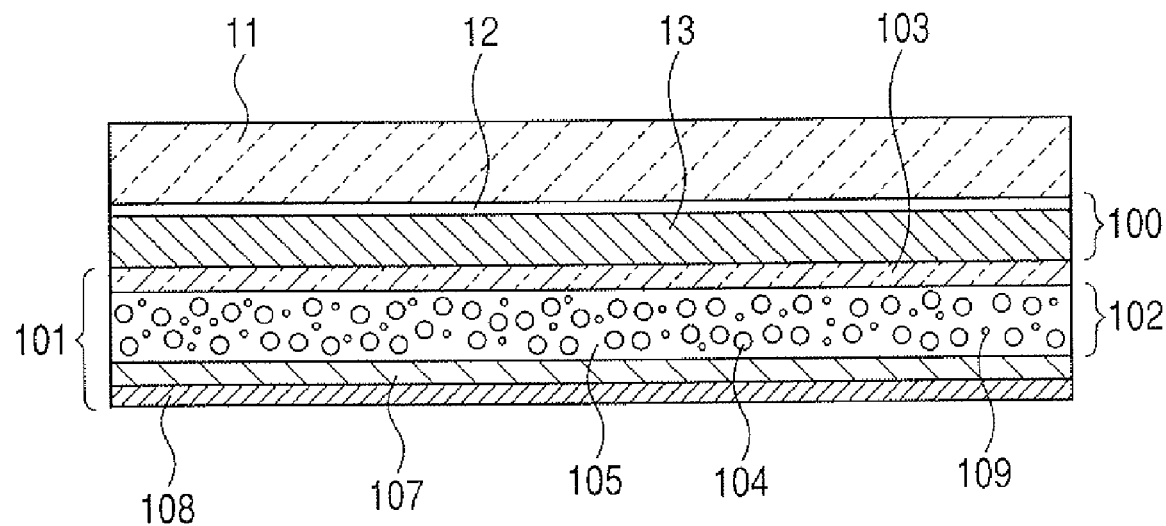
FIG. 3 is a cross-sectional view illustrating another embodiment of the radiation detecting apparatus according to the present invention.

FIG. 3 is a cross-sectional view of a radiation detecting apparatus according to this embodiment. As shown in FIG. 3, the light emitting unit 101, the sensor panel 100, and the scintillator layer 11 being CsI (Tl) are arranged in the apparatus, similarly to the first embodiment. Differently from the first embodiment, the light emitting layer 102 does not contain a black pigment, but contains purple and red pigments. That is, the light emitting layer 102 of the light emitting unit 101 contains two kinds of pigments 109. In that case, the layer 102 containing the two kinds of pigments 109 also absorbs light from the light emitting unit 101. However, the amount of light emission from the light emitting unit is larger than the light transmitting the substrate 13 from the sensor panel by light emission from the scintillator layer. In the above manner, light necessary for optical calibration can transmit the apparatus, thereby reducing reflected light inducing degradation of the image quality to an unproblematic level in view of the quality.

This embodiment uses pigments of two colors. However, the respective colors including blue as described in the above can be mixed for further blackening to reduce reflected light.

Third Embodiment

Figure 4:
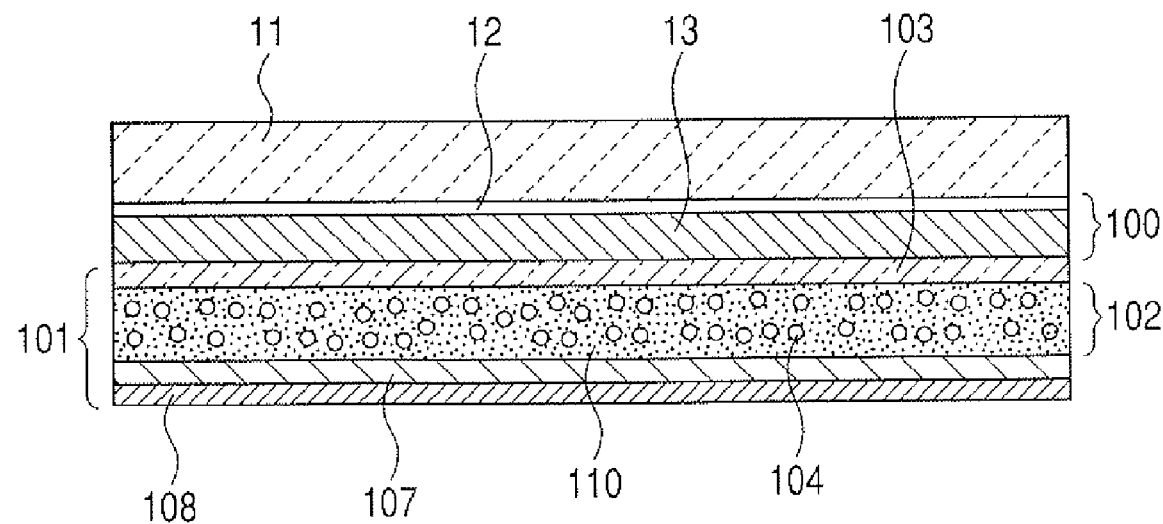
FIG. 4 is a cross-sectional view illustrating still another embodiment of the radiation detecting apparatus according to the present invention.

FIG. 4 is a cross-sectional view of a radiation detecting apparatus according to this embodiment. As shown in FIG. 4, the light emitting unit 101, the sensor panel 100, and the scintillator layer 11 being CsI (Tl) are arranged in the apparatus, similarly to the second embodiment. Differently from the second embodiment, the light emitting layer 102 does not contain pigments but contains dyes. The dyes are purple and red similarly to the second embodiment. As such, the light emitting layer 102 of the light emitting unit 101 includes the light emitting substance 104 and a binder 110 containing dyes. The binder is colored by the dyes so that the colored binder efficiently absorbs light transmitting the substrate 13 from the sensor panel by light emission from the scintillator layer. Accordingly, a trace amount of components are reflected on the photoelectric conversion element array 12 of the sensor panel 100. The binder 110 containing dyes also absorbs light from the light emitting unit 101. As such, the amount of light emission from the light emitting unit is larger than the light transmitting the substrate 13 from the sensor panel by light emission from the scintillator layer. In the above manner, the binder is colored by dyes so that light necessary for optical calibration can transmit the apparatus, thereby reducing reflected light inducing degradation of the image quality to an unproblematic level in view of the quality.

In this embodiment, the respective colors including blue as described in the above can be mixed for further blackening to reduce reflected light, similarly to the second embodiment.

According to the present invention being described in the above, in the radiation detecting apparatus having an optical calibration function, the light emitting layer of the light emitting unit contains a black pigment and pigments or dyes of two colors other than the black pigment so that reflected light to the sensor panel can be efficiently reduced. Hence, the image quality can be stabilized. Additionally, the configuration does not need to be added with a wavelength-selective filter, simplifying the configuration of the radiation detecting apparatus. Consequently, the highly reliable radiation detecting apparatus can be realized.

As described in the above, the present invention can be also applied to a medical X-ray sensor and the like. Further, the present invention is also effective in the application to other techniques such as non-destructive testing.

As many apparently widely different embodiments of the present invention can be made without departing from the spirit and scope thereof, it is to be understood that the invention is not limited to the specific embodiments thereof except as defined in the claims.

This application claims priority from Japanese Patent Application No. 2007-155153 filed on Jun. 12, 2007, which is hereby incorporated by its reference herein.

What is claimed is:

1. A radiation detecting apparatus comprising:
a sensor panel having a substrate and a photoelectric conversion element array arranged on the substrate;
a scintillator layer arranged on one surface side of the sensor panel; and
a light generator arranged on the sensor panel at the other side in opposition to the one side on which the scintillator layer is arranged, in corresponding to an area in which the photoelectric conversion element away is arranged,
wherein the light generator comprises a light transmitting electrode layer, a rear electrode layer and a light emitting layer arranged between the light transmitting electrode layer and the rear electrode layer, the light transmitting electrode layer is arranged on the light generator at a side facing the sensor panel, and the light emitting layer is formed from light emitting substance, a binder and a black pigment.

2. The radiation detecting apparatus according to claim 1, wherein the photoelectric conversion element array comprises a plurality of pixels, and the light emitting layer contains the black pigment to have a distribution profile such that an average concentration of the black pigment in an area facing an area between adjacent pixels is larger than an average concentration of the black pigment in an area facing each of the pixels.

3. The radiation detecting apparatus according to claim 1, wherein the light generator is an electroluminescence type.

4. A radiation detecting apparatus comprising:
a sensor panel having a substrate and a photoelectric conversion element array arranged on the substrate;
a scintillator layer arranged on one surface side of the sensor panel; and
a light generator arranged on the sensor panel at the other side in opposition to the one side on which the scintillator layer is arranged, in corresponding to an area in which the photoelectric conversion element away is arranged,
wherein the light generator comprises a light transmitting electrode layer, a rear electrode layer and a light emitting layer arranged between the light transmitting electrode layer and the rear electrode layer, the light emitting layer is formed from light emitting substance, a binder and a pigment or a dye, and the pigment or the dye contains a first pigment or dye absorbing a light of the same wavelength of a maximum light emission from the scintillator layer, and a second pigment or dye absorbing a light of a wavelength different from a wavelength of the light which the first pigment or dye absorbs.

5. The radiation detecting apparatus according to claim 4, wherein the scintillator layer is contains CsI:Tl, the first pigment or dye is colored purple, the second pigment or dye is colored at least one selected from the group consisting of yellow, orange, red, red-purple, blue, blue-green and green-blue.

6. The radiation detecting apparatus according to claim 4, wherein the pigment or dye absorbs light of wavelength 400 to 750 nm.

7. The radiation detecting apparatus according to claim 4, wherein the photoelectric conversion element comprises a plurality of pixels, and the light emitting layer contains the pigment or dye to have a distribution profile such that an average concentration of the pigment or dye in an area facing each of the pixels is larger than an average concentration of the pigment or dye in an area facing an area between adjacent pixels.

8. The radiation detecting apparatus according to claim 4, wherein the light generator is an electroluminescence type.

9. A radiographing system comprising:
a radiation detecting apparatus according to claim 1 or 4; and
a signal processing unit for processing a signal from the radiation detecting apparatus.

* * * * *